United States Patent

[11] 3,543,895

| [72] | Inventor | Gerard T. Klees |
| | | Rochester, Michigan |
| [21] | Appl. No. | 825,339 |
| [22] | Filed | May 16, 1969 |
| [45] | Patented | Dec. 1, 1970 |
| [73] | Assignee | General Motors Corporation |
| | | Detroit, Michigan |
| | | a corporation of Delaware |

[54] OVERRUNNING DEVICE
6 Claims, 4 Drawing Figs.

[52] U.S. Cl. .................................................... 192/45.1
[51] Int. Cl. ....................................................... F16d 41/07
[50] Field of Search ............................................ 192/41(.3), 45.1; 188/82.8

[56] References Cited
UNITED STATES PATENTS

| 2,845,159 | 7/1958 | Stephenson | 192/45.1X |
| 3,061,060 | 10/1962 | Stephenson | 192/41.3X |
| 3,311,204 | 3/1967 | Barnard | 192/41.3X |
| 3,353,639 | 11/1967 | Andriussi | 192/41.3X |

*Primary Examiner* — Allan D. Herrmann
*Attorneys* — Warren E. Finken and F. J. Fodale

ABSTRACT: An overrunning device using a one-piece sheet metal sprag assembly is disclosed. The one-piece sprag assembly includes a plurality of circumferentially spaced S-shaped sprag elements interconnected by sinuous resilient annuli on both sides. The resilient annuli space the sprag elements, orient them to their overrunning position, and provide a returning force to the sprag elements from their lockup position to their overrunning position.

INVENTOR.
Gerard T. Klees
F. J. Fodale
ATTORNEY

OVERRUNNING DEVICE

My invention relates generally to overrunning devices and more specifically to an overrunning device of the sprag type wherein a plurality of sprags or wedges allow overrun between the inner and outer races in one direction and lockup the races in the other direction.

Overrunning sprag devices most commonly used today have a plurality of sprag elements machined to close tolerances, some form of spring or springs to urge the sprags to their overrunning position and some structural form, for example, a cage, to space the sprag elements. These overrunning sprag devices while satisfactory from an operational standpoint are relatively expensive to manufacture because of the manufacture of the sprag elements themselves and the requirement for further incorporation into the device of other discrete parts, such as, springs, cages, and the like. My invention is broadly directed toward eliminating these other discrete parts by providing a simple one-piece member which incorporates the sprag elements as well as other discrete parts and/or their functions. Such attempts have been made in the past, as for instance, as shown in the U.S. Pats. to Stephenson U.S. Pat. Nos. 2,845,159 and 3,061,060 assigned to the assignee of the present invention. My approach is unique, however, in that it incorporates features not previously provided. For example, I have closely approximated in sheet metal sprag elements the desirable features, such as stiffness and smoothly contoured engagement surfaces of the relatively expensive machined-type sprag. Another feature of my unitary design is that the incorporation of the spring is such that the spring force is provided by a totally elastic deformation of the portions of the unitary sprag assembly involved and these involved portions are of the same thickness as the uninvolved portions. In fact, another feature of my invention is that the entire unitary sprag assembly has the same thickness. In addition, I have incorporated in my design a unique feature whereby the sprag assembly can be manufactured from a strip of material with suitable punching and bending dies resulting in ease of manufacture accompanied by a substantial reduction in manufacturing cost.

The exact nature of this invention as well as other features and advantages thereof will be readily apparent from consideration of the following specification relating to the annexed drawings in which.

Figure 1:
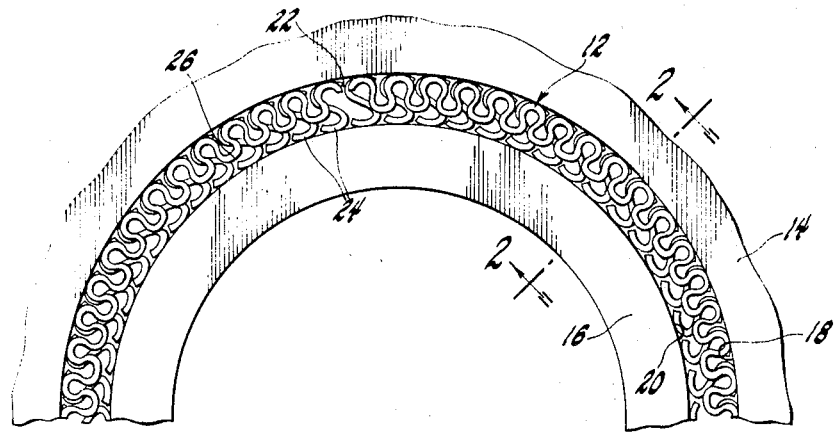
FIG. 1 is a front view of an overrunning device in accordance with my invention.
Figure 2:
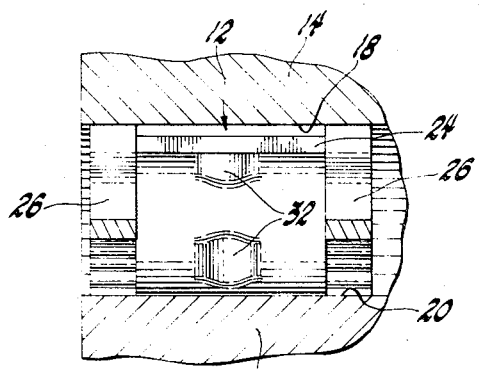
FIG. 2 is a section taken along the line 2-2 of FIG 1 showing an axial profile of a sprag assembly and its relationship to the races in accordance with my invention.
Figure 4:
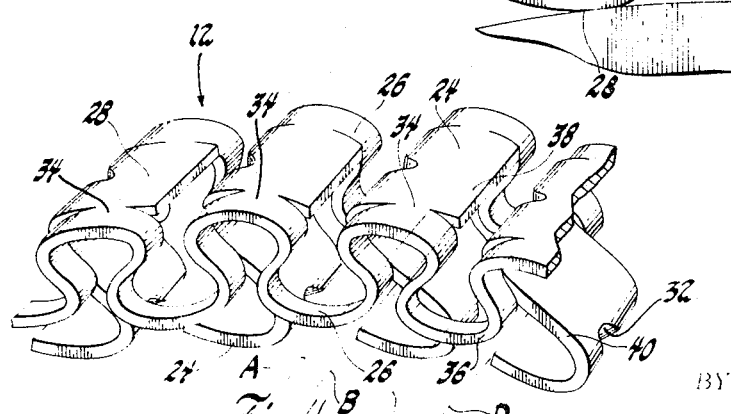
FIG. 4 is an isometric view of a portion of a sprag assembly in accordance with my invention.

Referring now to the drawings and more particularly to FIG. 1, the sprag assembly indicated generally at 12 is disposed between an outer race 14 and an inner race 16 having radially spaced confronting cylindrical surfaces 18 and 20, respectively. As will be explained more fully below, the sprag assembly 12 is designed to be fabricated from a strip of sheet stock which when coiled into annular form is not completely continuous. The beginning and end of the strip produces a gap indicated at 22 and accordingly, the sprag assembly may be described as an open annulus. The sprag assembly 12 includes a plurality of circumferentially spaced sprag elements 24 which engage both of the cylindrical surfaces 18 and 20. The sprag assembly 12 further includes a somewhat sinuously-shaped member 26 which again due to the gap 22 can be described as an open annulus. In reference to FIGS. 2 and 4, it is seen that there are actually two such annuli 26 and that the amplitude of their sinuous shape is less than the height of the sprag elements 24 or the space between the races 14 and 16.

The sprag elements and are S-shaped, each being provided with an arcuate surface 28 at the top and the bottom of the S which engages the cylindrical surfaces 18 and 20, respectively.

Figure 3:
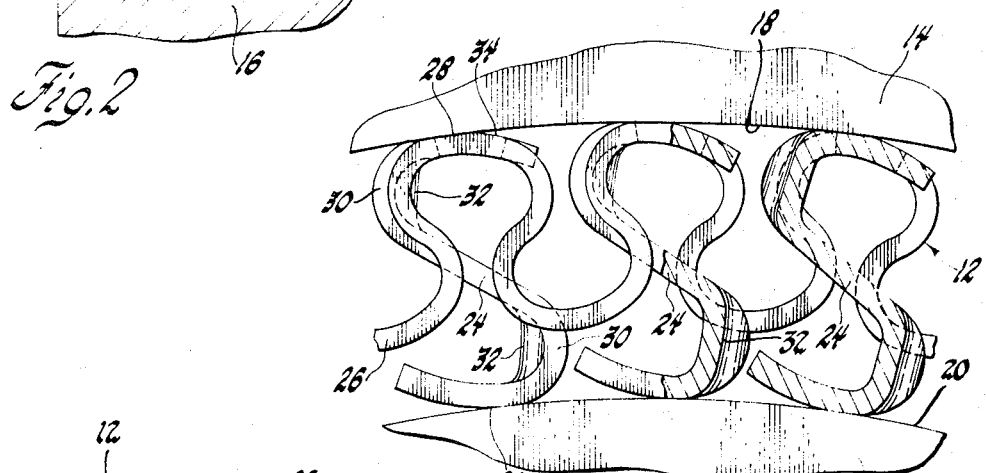
FIG. 3 is an enlargement of a portion of FIG. 1 with various portions of the sprag assembly broken away for clarity.

The S-shaped sprag elements 24 are shaped and dimensioned so that when sprag elements 24 are in the position shown in FIG. 3, the inner race 16 overruns the outer race 14 in the clockwise direction. In response to rotation of the inner race 16 in the counterclockwise direction, however, the sprag elements 24 tilt clockwise and the arcuate surfaces 28 wedgingly engage the cylindrical surfaces 18 and 20 to lockup the races. The bight portions 30 of the S-shaped sprag element 24 are indented at their midportion 32 to add strength and rigidity to the sprag elements so that their operational characteristics conform more closely to the characteristics of a machined sprag.

The somewhat sinuous, open annuli 26 are integrally attached at 34 to each of the sprag elements 24 at the radially outer arcuate portion of the S. The function of the annuli 26 is threefold. First, the annuli 26 circumferentially space the sprag elements 24. Secondly, they position the sprag elements 24 for race overrunning in the unstressed condition of the annuli 26. Thirdly, the annuli 26 are sufficiently resilient allowing the sprag elements 24 to tilt in response to counterclockwise rotation of the inner race 16 to wedge between the races and lock them up and storing energy which provides a force to return the sprag elements 24 to their overrunning position.

The annuli 26 are preferably designed not only to provide all of these functions but also in such a manner that they can be stamped out from a strip of sheet stock which also provides the material for the sprag elements 24. More specifically, in connection with FIG. 4, the linear trace in the circumferential direction of the free portions of each annulus 26 is equal to or greater than the linear trace in the circumferential direction of the free portion of the associated sprag elements 24. In other words, the length of the annulus portion 36 between points A and B when the annulus portion 36 is flattened out is equal to or greater than the sum of the length of the portion 38 of the sprag 24 between points A and B when it is flattened out and the portion 40 of the adjacent sprag 24 to the right between the points C and D when it is flattened out. Thus there is sufficient metal between attachment points on adjacent sprag elements 24 from which to form the portion of the annuli 26 between the attachment points 34.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

I claim:

1. An overrunning device comprising: in combination,
   outer and inner coaxial races having confronting cylindrical surfaces with a radial space therebetween;
   a one-piece, sheet metal sprag assembly disposed between said races, said sprag assembly comprising a plurality of circumferentially spaced sprag elements, each of which have arcuate surfaces engaging said cylindrical surfaces, respectively, said sprag elements being dimensioned and shaped such that said arcuate surfaces slip with respect to said cylindrical surfaces in a first position of said sprags and wedgingly engage said cylindrical surfaces in a second position of said sprag elements; and
   a resilient, open annulus integrally connected to each of said sprag elements at each axial end thereof, said annuli being sinuous-like in cross section with an amplitude less than said radial space between said races, said annuli circumferentially spacing and orienting said sprag elements in said first position and resiliently urging said sprag elements from said second position toward said first position whereby said races are relatively rotatable in response to rotation in a first direction by one of said races and are locked up in response to rotation in the opposite direction by said one race.

2. The overrunning device as defined in claim 1 wherein said sprag elements have a linear trace in the circumferential direction of their free portions no greater than the linear trace in the circumferential direction of the free portions of said annulus.

3. The overrunning device as defined in claim 1 wherein said sprag elements are S-shaped and integrally connected to said annuli at their radially outer arcuate portion.

4. The overrunning device as defined in claim 2 wherein said sprag elements are S-shaped and integrally connected to said annuli at their radially outer arcuate portion.

5. The overrunning device as defined in claim 3 wherein each of said sprag elements are indented midway in each of their bight portions for increased rigidity.

6. The overrunning device as defined in claim 4 wherein each of said sprag elements are indented midway in each of their bight portions for increased rigidity.